Nov. 10, 1959     F. L. MALTBY     2,912,052
PROGRAM CONTROL

Filed Nov. 3, 1954     2 Sheets-Sheet 1

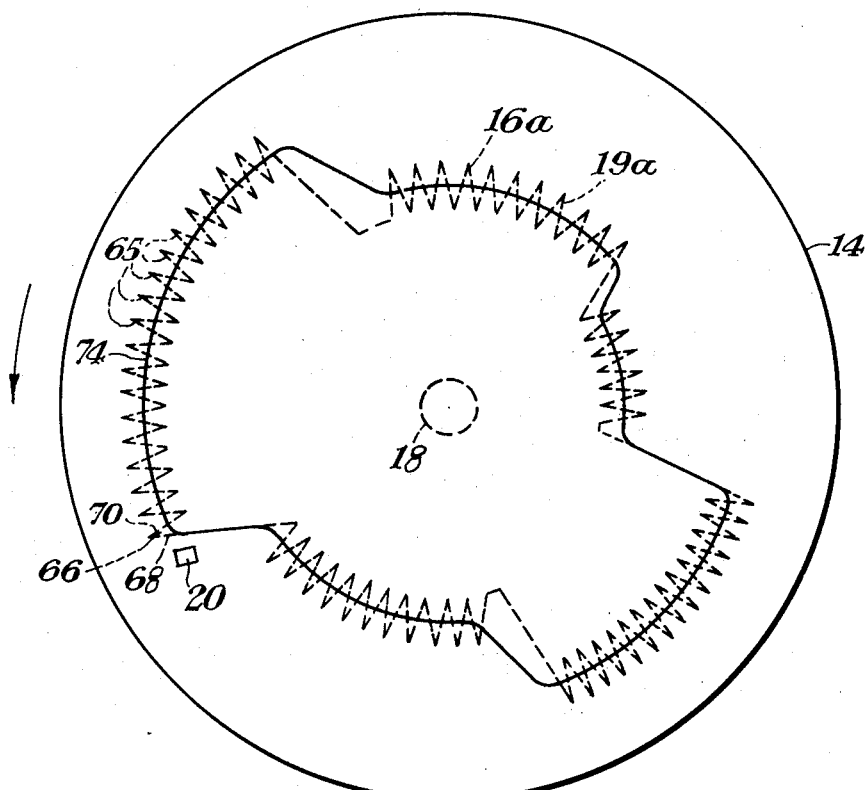
Fig. 2.
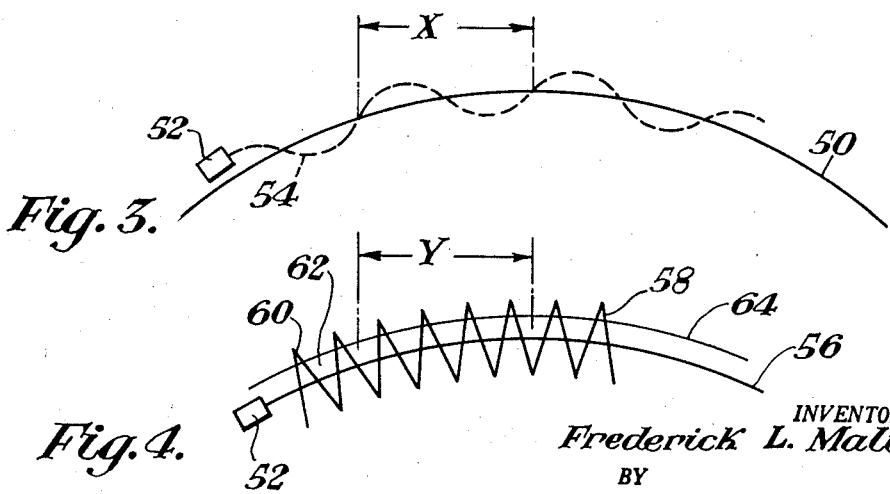
Fig. 3.
Fig. 4.
INVENTOR.
Frederick L. Maltby.

United States Patent Office 2,912,052
Patented Nov. 10, 1959

2,912,052
PROGRAM CONTROL

Frederick L. Maltby, Riverton, N.J., assignor to Robertshaw-Fulton Controls Company, Richmond, Va., a corporation of Delaware Application November 3, 1954, Serial No. 466,575

9 Claims. (Cl. 161—1)

This invention relates to program control mechanisms for controlling the magnitude of a variable in accordance with predetermined time cycles of operation and particularly to an accessory program control for a recording and/or controlling apparatus.

In apparatus of this general character, various time controls have been used in association with a recorder mechanism to effect a desired controlled program and the most notable of these have included clock-driven cams associated with a plurality of cam followers for mechanically actuating a system of gears, levers, and other cams for eventually controlling a desired condition. In such devices it has been customary to machine the edges of a cam in accordance with a particular program to which the controlled condition or variable is to correspond. However it has been found that this type of program control cam is limited in its shape and form in that sharp, sloping curves and inverse cutbacks must be avoided since these contours cannot be followed by the conventional cam followers. Furthermore, the present day nonprogram controlled recording instruments cannot be modified to include such complicated cam mechanisms and therefore the user must discard these obsolete instruments in favor of a new and complete program control instrument.

Another disadvantage of cam-operated program is the bulkiness of the cam and cam-following mechanism, and this tends to increase the size of the instrument casing beyond its usefulness. Mobility is lost and installation and maintenance become costly.

Heretofore, in devices of this general character wherein recording and controlling instruments are combined, great inconvenience has been encountered when the completed graphic record is desired to be removed and a new blank chart inserted, as the cam and cam following mechanism is ordinarily in the way. This difficulty is particularly encountered when it is desired to move the particular program cam for inserting a new one in its stead.

It is also desirable from the standpoint of compactness and ruggedness, to make the over-all recording assembly and control pickup means as simple and compact as possible, employing a minimum of components and utilizing all available space and accomplishing the above at a minimum cost. There has been need for a program control which may be easily adapted to any present day recorder and controlling apparatus and which is made from easily assembled parts. Therefore, it is an object of this invention to insure complete and accurate control of a program employing a minimum of components which may be adapted for any conventional recorder-controller.

Another object of the invention is to utilize a control apparatus which is inherently safe in operation in the event of power or equipment failure.

Another object of the present invention is to arrange the programming means for any conventional recording instrument for easy removal and substitution therefor of a different programming means.

Generally stated, the apparatus of the present invention comprises a capacitance pickup device which may be applied to a recording mechanism which is movable in response to a condition desired to be controlled and a clock driven movable chart of a recording control apparatus. The pickup device includes two plates of a capacitor one of which is insulatively secured to the recorder pen and the other to the movable chart or its related shaft to be moved therewith. The outline of the chart capacitor plate is of a form corresponding to the desired process to be controlled as projected on the recording chart in the form of a selected value curve. The capacitance between these plates is predetermined when the pen plate and guiding edge of the chart plate are juxtaposed and any deviation of this plate in a direction away from the guiding edge and the plate will cause a sharp change in capacitance which change feeds into a capacity relay. An electrical signal is thereby generated at the capacity relay in accordance with the magnitude of the capacitance and its relationship or direction with respect to the predetermined value of the capacitance when the plates are juxtaposed and this signal serves to energize or deenergize, as the case may be, a conventional relay-operated control apparatus which in turn controls the condition until the recording pen is moved back to its juxtaposed position with the guiding edge of the program chart plate.

Other objects and advantages will become apparent from the following description taken in connection with the accompanying drawings, wherein:

Fig. 2 is a schematic view showing a modification of a part of the invention;

Fig. 3 shows an example of a scribed hunting wave form encountered in an on-and-off self-generated control system; and Fig. 4 shows an example of a scribed wave form encountered in a proportional control system.

Figure 1:
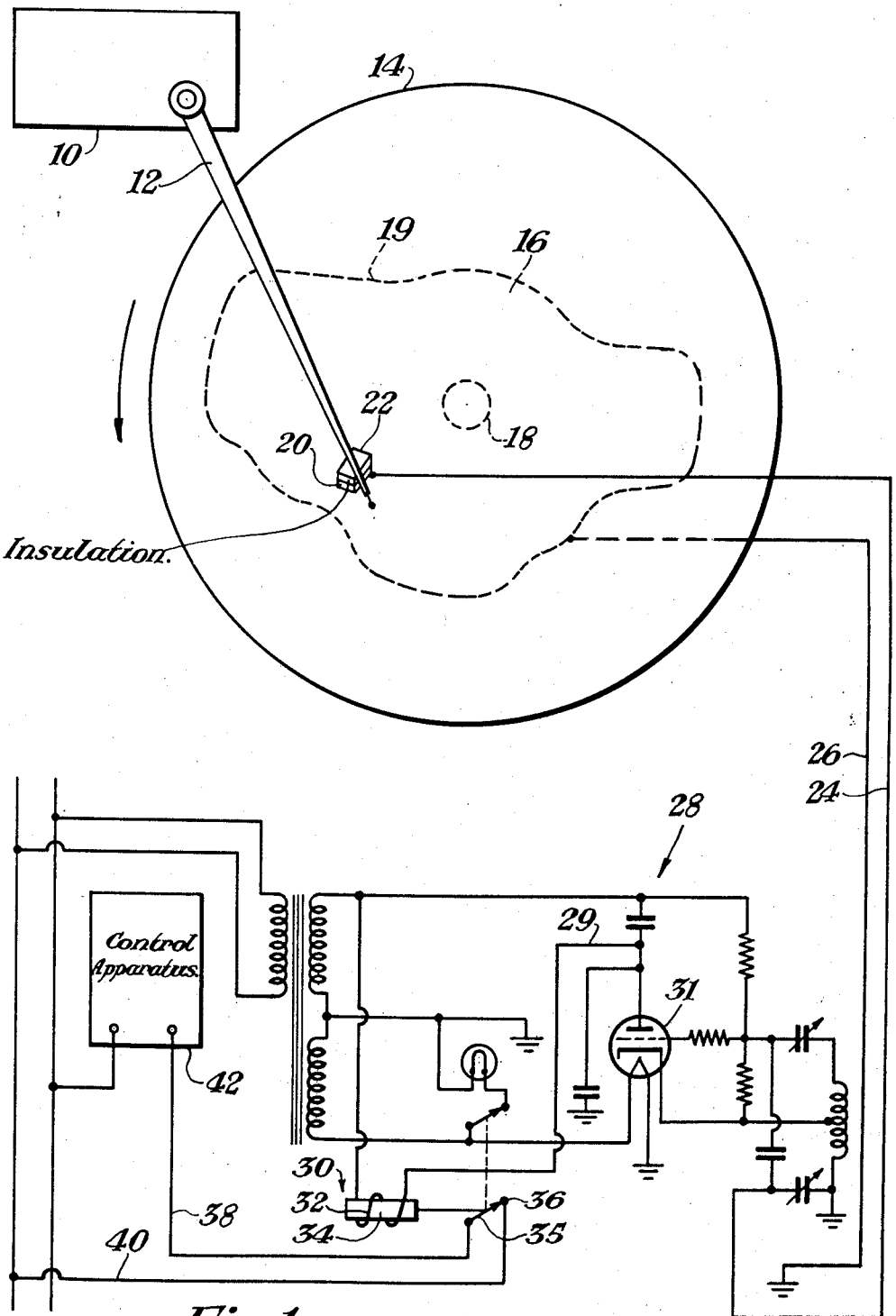
Fig. 1 is a schematic arrangement of a preferred embodiment of the invention as applied to a recorder-controlling apparatus.

Referring now to Fig. 1 of the drawing, there is shown a recording mechanism 10 as adapted to be operated by a condition responsive mechanism (not shown). The condition responsive mechanism may be of any conventional type, for instance, a bellows, a servo-mechanism, a thermal responsive unit or any other suitable means for responding to electrical current, liquid level, temperature, pressure, fluid flow, etc. The recording mechanism 10 has associated therewith a recording pen 12 for scribing any desired set of values for a condition sensed by the condition responsive mechanism. A time-driven rotatable chart 14 serves to record the value of the condition as charted by the recording pen 12. It is to be understood that the recording mechanism 10, the recording pen 12 and the chart 14 are all of conventional design and form no part of the present invention.

For purposes of illustration there is shown in Fig. 1 a simple form of an on-and-off program control device cooperating with the mechanism herein above described. To this end, the rotatable chart 14 is provided with a metallic plate or conductive coating 16 insulatively secured to the undersurface thereof and which is rotatable in accordance with a predetermined time cycle by a driving shaft 18. It is to be noted that the plate 16 may be secured to the shaft 18 instead of the chart 14 and in either position, any suitable means may be employed for effecting this attachment. The plate 16 is formed with an outline guiding edge 19 indicative of the desired program to be controlled. Such an outline may conform to the selected value curve which would be scribed on the recording chart 14 by the recording pen 12 for a perfectly controlled similar process having predetermined and periodic values of a variable during a particular time cycle. Such a selected value curve may be computed and projected onto a sheet of conducting material and the desired program plate cut therefrom along the projected curve. An ideal repetition of the standard process during the same timing cycle would be possible if the condition or variable was controlled to follow the outline of the program plate as evidenced by the curve charted by the recording pen. Saying it another way, the outline 19 of the program plate 16 will be made such that with the pen 12 following the desired time function of the selected value curve, will also follow the outline of the program plate.

To attain this goal, a capacitance pickup device is utilized for detecting the deviation of the recording pen from the guiding outline edge 19 of the program plate 16. The pickup device comprises a plate 20 secured to the recording pen 12 by screws or any other suitable means and is insulated therefrom by an insulating pad 22. The program plate 16 and the plate 20 effectively define a capacitor for an oscillatory circuit to be described hereinafter.

Conductors 24, 26 connect the plate 16, 20 respectively to a capacity relay generally indicated by the reference numeral 28 which may be of any stable capacity controlled electronic relay type having a discharge tube 31 and a pair of resonant frequency determining circuits of predetermined impedance, one of which includes the capacitor defined by the plates 16, 20 for varying the feedback to the grid-cathode circuit of the tube 31.

The capacity relay 28 is designed to pass minimum current in a plate circuit 29 when the plate 20 is exactly juxtaposed with respect to the program plate 16 or the guiding edge 19 and any deviation from the edge 19 which is in a direction to increase the capacitance between the plates 16, 20, serves to increase the referred to plate current wherein a relay having its excitor coil in series therewith will be energized thereby to actuate a control apparatus for varying the controlled variable. In this manner, the process will assume a condition which will affect a condition responsive mechanism for driving the recording mechanism 10 to a corrected position and once again the system is balanced and disposed for any other deviation between the controlled variable and its desired value.

A relay indicated generally by the reference numeral 30 and having its excitor coil 32 in series with the plate circuit 29 of the capacity relay 28 is arranged to attract an armature 34, and movable contact 35 when energized, to establish electrical contact with a stationary contact 36. The movable contact 35 is normally biased to a spaced open position relative to the contact 36 when the excitor coil 32 is deenergized and assumes the closed position shown when a predetermined value of current flows through the coil 32 caused by a corresponding increase in the current flowing in the plate circuit 29 of the capacity relay 28. Conductors 38, 40 connect the contact 36 with a control apparatus 42 and a source of ordinary alternating current L1, L2, in the usual manner.

The normal operation of the device is as follows: The operator of the apparatus sets up the control apparatus to fit the needs of a particular process or condition to be controlled and arranges for the recording thereof in the usual manner as is customary in the use of these instruments. Assuming then that the program chart 14 or its related shaft 18 has been equipped with the program plate 16 and that the recording pen 12 carries the insulated tracer pad 22, the apparatus is now in condition for controlling the process in accordance with a desired selected value curve from which the outline edge 19 has been designed. The capacity relay 28 has been tuned so that the relay 30 is energized when the plate 20 is juxtaposed over the program plate 16 as shown in Fig. 1. Energization of the relay 30 occurs only when the plate 20 deviates away from the edge 19 of the plate 16. While energized, the relay 30 may be arranged to direct the control apparatus 42 to increase the magnitude of the variable and while in a deenergized condition to decrease the variable. With these assumptions in mind, as the pen 12 glides over the recording chart 14 from the position shown in Fig. 1, the relay 30 will continue to be energized causing an increase in the magnitude of the variable until the plate 20 travels beyond the outlying guiding edge 19 of the plate 16. With the plate 20 in a position beyond the edge 19, the capacity relay 28 will respond to pass minimum current in the excitor coil 32 thereby causing deenergization of the relay 30 with the consequent opening of the circuit to the control apparatus 42. From this it follows that the variable will decrease until the pen 12, in recording the state of the condition, is driven toward the edge 19. The cycle is repeated, if at any time, the recording pen deviates from the edge 19 of the plate 16, say by the change of slope of the guiding edge, or by a decrease in the magnitude of the variable to be controlled.

It is to be noted that at any time the plate circuit 29 is accidentally opened, such as by failure of the tube 31, the relay 30 will be deenergized thereby opening the circuit to the control apparatus 42. In addition, failure of line power will result in a complete shutdown of the control apparatus. In such events, the capacity relay 28 is fail safe in regard to tube or line failure and the controlled variable is allowed to decrease in order to protect the particular process being controlled and the control equipment if an undetected and uncontrolled increase of the variable is inherently dangerous.

In the modification shown in Fig. 2, similar reference numerals have been used, where necessary, for corresponding parts and further description thereof is considered unnecessary. This modification differs from the embodiment of the "on-and-off" program control shown in Fig. 1 by the provision of a different mode of accomplishing the control of a variable, which mode utilizes the Gouy average position control principle resulting in the proportional control of the variable.

It is generally known in the art that some processes, such as the type controlled within various temperature ranges, experience a process time lag to corrective changes in the application of an agent, such as heat, following a departure of the controlled condition from its set point or desired value. The simple "on-and-off" controller is inadequate for this type of process control because of hunting of the condition responsive device around the control set point. An illustration of this inadequacy is shown in Fig. 3 wherein a curve 50 corresponding to the guiding edge 19 in Fig. 1 and indicative of selected values of a condition, say temperature, is to be followed by a recording pen 52.

In Fig. 3, a dotted line 54 is shown as indicating the actual recorded status of the condition over a period of time and takes the form of an approximate sinusoidal curve. Because of the considerable time lag involved in response to a corrective factor, the pen 52 instead of following the curve 50 will overshoot and undershoot, so that continuous and periodic movement above and below the line 50 will result. This hunting is proportional to the time lag factor in the process so that the amount of deviation of the pen 52 above or below the line 52 will increase with greater time lag and conversely, with lesser time lag, the deviation will be slight.

For processes which are burdened with appreciable time lags, it has been customary to artificially impose interruptions of the "on" position of a control apparatus at a regular frequency which is at least twice the natural hunting frequency of the system under self-generated "on-and-off" regulation, such as the system illustrated in Fig. 1. In the art, the system employing means to periodically interrupt the application of a corrective change is referred to as "proportional" or "average position control" and such a system provides means for permitting the condition to determine the percentage of the "on" position of any particular time cycle. In other words, if a control apparatus operates to increase the amount of the corrective agent only during one half of a particular time cycle and during the other half cycle, the amount of the agent is allowed to decrease, and it follows that the one half cycle time period, during which the agent is increasing must be shortened to properly maintain the condition at its desired set point, means are provided whereby the condition will determine the increment of "on" position time of the time cycle.

In Fig. 4 there is shown a selected value curve 56 to be traced by the recorder pen 52 as was the case in Fig. 3. However, instead of controlling the process as the pen 52 dips below or rises above the line 56, the process is made to be controlled so that the corrective factor is applied to the process in alternate half cycle periods only. This type of control is illustrated in Fig. 4 by a saw tooth curve 58 which projects above and below the curve 56 in alternate half cycles respectively. When the pen 52 reaches a tooth 60 of the curve 58, the corrective agent would be applied to the process and the condition, say temperature, would decrease, however, since a time lag is present in the process, the process would not respond to the new situation until the pen 52 has progressed beyond the contours of the tooth 60 and occupies a position in a space 62 wherein the corrective agent is once again removed from the process. This cycle is repeated and the resulting scribed line on a recorder chart closely approximately the selected value curve 56.

However, in the event that the half-on and half-off application of the corrective agent raises the value of the condition to-be-controlled beyond its set point so that less time for the "on" position is required to maintain the condition at its set point, the condition responsive device or other suitable follow-up device will adjust the system to permit the application of the corrective agent to occur during a smaller increment of time, say only during one-third of a time cycle instead of the initial one-half period. In this case, the pen 52, in Fig. 4 would follow the curve 64.

As previously stated, the frequency of the on-and-off regulation for proportional control is at least twice the hunting frequency of the self-generated on-and-off control of the type illustrated by the embodiment of Fig. 1. The letter X in Fig. 3 indicates the length of a complete cycle of hunting experienced by the pen 52. In Fig. 4, the letter Y denotes the length of four complete cycles of on-and-off proportional control so that if X is made to equal Y, the frequency of the on-and-off regulation for proportional control is four times the hunting frequency of the self-generated control. In the example shown in Fig. 4, the corrective factor is applied to the process during four equal increments of time for a particular time cycle for every single increment of time in which the corrective factor is applied to the example of Fig. 3 during the same time cycle. The increment of time in the former example is much shorter than that in the latter, resulting in negligible hunting in the former.

In adapting the on-and-off recorder-controller system of Fig. 1 to operate as a proportional control embodying the principles discussed above, means are provided for periodically energizing the relay 30 at a regular frequency. As shown in Fig. 2, such means takes the form of a program plate 16a having a guiding edge 192 with evenly spaced teeth 65 formed thereon and which may be insulatively secured to either the chart 14 or its time driven shaft 18. A line 74 connecting the mid-points of each of the teeth 65 represents a selected value curve for the program plate 16a in much the same fashion as the edge 19 represented the selected value curve of the plate 16 in the embodiment of Fig. 1.

The plate 16a and the probe plate 20 which is insulatively secured to the recording pen 12 are electrically connected to the capacity relay 28. The function of the plates 16a and 20 is identical with that of the plates 16 and 20 in the embodiment of Fig. 1, and in the modification of Fig. 2, the identical circuit and component parts shown in Fig. 1 are utilized.

In the operation of the embodiment of Fig. 2, the energization of the relay 30 with the consequent operation of the control apparatus 42 occurs when the probe plate 20 is in juxtaposed position with respect to the teeth of the guiding edge 19a. Conversely, the control apparatus 42 is unoperative when the plate 20 moves away from the edge 19a. Assuming then that the plate 20 is spaced a slight distance away from a tooth 60 of the edge 19a and the chart 14 is time driven in the direction of the arrow as shown in Fig. 2, and the control apparatus 42 is applying a corrective factor to a process being controlled, when the plate 20 is exactly over the forward edge 68 of the tooth 66, the relay will be energized and the application of the corrective agent will commence. However, the effect of this correction is not immediately evident, and the pen 20 continues to record the previous status of the condition.

Eventually, response to the correction will effect the position of plate 20, however, by the time the plate 20 reaches the rear edge 70 of the tooth 66, the correction will have terminated. This cycle is repeated as the chart 14 is rotated with each forward and rearward edge of the teeth 65 anticipating a corrective change until the desired condition curve 74 is complete. It is to be noted that the curve 74 is not perfectly curvilinear since all recorder-controller apparatus are susceptible to some degree of hunting. It is sufficient to say that the curve 74 approximates a true curve for all practical purposes and in comparison with the curve 54 in Fig. 3, the deviation from the curve 74 is negligible.

As previously stated, the curve 74 traverses the mid-points of the height of each of the teeth 65 and would normally be traced by the pen 12 in the event that the proper control of the condition-to-be-controlled is maintained with the control apparatus 42 operating at one half of a particular time cycle. However, in the event that the length of time during when the control apparatus 42 is "on" is too much for maintaining the proper set point of the condition-to-be-controlled, the plate 20 will adjust itself outwardly from the curve 74 to a new indicating and correction position and conversely, if the "on" period is too short, the plate 20 will move along a curve slightly inwardly of the curve 74.

The height of the teeth will determine the proportional band of the controller. The proportional band should be as narrow as possible without excessive hunting or cycling of the controlled process. In this way, the condition-to-be-controlled sets the percentage of the "on" time for the control apparatus 42.

The program control device of this invention may be adapted for any type of recording instrument on the market today and requires only the simple attachments of an insulated plate to a recording pen and the program chart to the underside of the recording chart or to its driving shaft. These plates may be easily installed, removed and replaced without the necessity of a complete stripping of the recording instrument casing. In addition, the program plate 16 and the pickup plate 20 may be formed from any suitable conducting material such as solid metal or metallic coated paper, plastic or glass. When using metallic coated materials, the expense of preparing a program chart is minimized and only a single cutting tool is required to prepare the plates. By backlighting the program plate 16, a shadow of the desired program curve will be projected upon the usual paper recorder chart thus giving the operator a means for instantly comparing the relationship between the desired curve and the traced curve. It will also be apparent from the drawings and the description that the electrical connections between the recording instrument, the capacity relay and the control apparatus allows these components to be located at relatively great distances from each other since the system does not depend upon mechanical linkages for their interconnection.

While particular embodiments of the invention have been shown for purposes of illustration, numerous other modifications of the principle embodied therein will suggest themselves to those skilled in the art. It is to be understood that the invention is capable of various uses and that various changes and modifications may be made thereon and the invention is to be limited only by the scope of the claims appended hereto.

I claim:

1. In an apparatus for indicating the time cycle of a condition and control means therefor, the combination with a time-driven control chart and associated recorder mechanism for recording the condition on said chart, a pair of spaced conductors defining a reactance element, one of said conductors being supported on said recording mechanism, the other of said conductors being movable with said chart and defining a program control guide, an oscillator circuit operatively connected to said reactance element and responsive to the variations of reactance of said pair of conductors, and a capacity relay connected to said circuit for generating a signal for actuating said control means to control the condition.

2. In an apparatus for indicating the time cycle of a condition and control means therefor, the combination with a time-driven rotatable control chart and associated recorder mechanism for recording the condition on said chart, a pair of spaced conductors defining a capacitor, one of said conductors being supported on said recorder mechanism, the other of said conductors being rotatable with said chart and defining a program control guide an oscillator circuit operatively connected to said capacitor and responsive to the variations of the capacitance of said pair of conductors, and a capacity relay connected to said circuit for generating a signal for actuating said control means to control the condition.

3. In an apparatus for indicating the time cycle of a condition and control means therefor, the combination with a time-driven control chart and associated recorder mechanism for recording the condition on said chart, a recording pen adapted to scribe continuous values of the condition on said chart, a pair of spaced conductors defining an impedance element, one of said conductors being supported on said recorder pen to move therewith, the other of said conductors being rotatable with said chart and defining a program control guide, an oscillator circuit operatively connected to said impedance element and responsive to the variations of impedance of said pair of conductors, and an impedance relay connected to said circuit for generating a signal for actuating said control means to control the condition in accordance with the rotation of said program control guide.

4. In an apparatus for indicating the time cycle of a condition and control means therefor, the combination with a time-driven control chart and associated recorder mechanism for recording the condition, a circuit means characterized by a predetermined impedance and having a pair of spaced conductors for varying said predetermined impedance, one of said conductors being movable with said recorder mechanism, the other of said conductors being movable with said chart and defining a program control guide, an oscillator circuit operatively connected to said circuit means and responsive to the variations of said predetermined impedance, and an impedance relay connected to said circuit for generating a signal for actuating said control means to control the condition.

5. In an apparatus for indicating the time cycle of a condition and control means therefor, the combination with a time-driven control chart and associated recorder mechanism for recording the condition, a circuit means characterized by a predetermined impedance and having a pair of spaced conductors for varying said predetermined impedance, one of said conductors being movable with said recorder mechanism, the other of said conductors being movable with said chart and having a surface thereon for defining a program control guide, said surface including means being adapted to cooperate with said one conductor to effect periodic variations of said predetermined impedance, and an oscillator circuit including an impedance relay operatively connected to said predetermined impedance and responsive to variations thereof for actuating said control means to control the condition.

6. In an apparatus for indicating the time cycle of a condition and control means therefor, the combination with a time-driven control chart and associated recorder mechanism for recording the condition on said chart, a pair of spaced conductors, one of said conductors being supported on said recorder mechanism, the other of said conductors being supported adjacent said control chart, said conductors adapted to be positioned relative to each other in accordance with predetermined minimum and maximum values of the condition, means defining an oscillator circuit responsive to variations of capacitance between said pair of conductors, an electronic relay system, and a circuit connecting said oscillator circuit to said system, said relay system being operable between energized and deenergized positions for controlling the condition between said predetermined minimum and maximum values respectively.

7. In an apparatus for controlling the time cycle of a condition, the combination with a time driven element and a control mechanism therefor, a pair of spaced conductors defining a reactance element, one of said conductors being movable with said time driven element, the other of said conductors being supported on said control mechanism and defining a program control guide, an oscillator circuit operatively connected to said pair of conductors and responsive to the variations of reactance of said pair of conductors, and a capacity relay connected to said circuit for generating a signal for actuating said control mechanism to control the condition.

8. In an apparatus for indicating the time cycle of a condition and control means therefor, the combination with a substantially flat time driven control chart rotatable about an axis normal thereto and associated recorder mechanism for recording the condition on said chart, a pair of spaced conductors, one of said conductors being supported adjacent one surface of said chart and rotatable therewith and having an edge portion of predetermined contour representative of the time cycle of the condition, the other of said conductors being supported on said recorder mechanism adjacent the other surface of said chart, said conductors being adapted to be positioned relative to each other to vary the capacitance therebetween in accordance with the predetermined contour of the edge portion of said one conductor, means defining an oscillator circuit responsive to variations of capacitance between said pair of conductors, and relay means operatively connected to said oscillator and operable between energized and de-energized positions thereby for controlling the condition whereby said other conductor is caused to follow the predetermined contour of the edge portion of said one conductor.

9. In an apparatus for indicating the time cycle of a condition and control means therefor, the combination with a substantially flat time driven control chart rotatable about an axis normal thereto and associated recorder mechanism for recording the condition on said chart, a pair of spaced conductors, one of said conductors being supported adjacent one surface of said chart and rotatable therewith and having a serrated edge portion of predetermined contour representative of maximum and minimum values of the time cycle of the condition, the other of said conductors being supported on said recorder mechanism adjacent the other surface of said chart, said conductors being adapted to be positioned relative to each other to vary the capacitance therebetween in accordance with the maximum and minimum values of the time cycle of the condition, means defining an oscillator circuit responsive to variations of capacitance between said pair of conductors, and relay means operatively connected to said oscillator and operable between energized and de-energized positions thereby for controlling the condition whereby the said other conductor is caused to follow the edge portion of said one conductor.

References Cited in the file of this patent

UNITED STATES PATENTS

| | | |
|---|---|---|
| 1,320,580 | Somerville | Nov. 4, 1919 |
| 1,353,434 | Stuart | Sept. 21, 1920 |
| 2,218,502 | Breitenstein | Oct. 22, 1940 |
| 2,272,257 | Vogt et al. | Feb. 10, 1942 |
| 2,277,502 | Padva | Mar. 24, 1942 |
| 2,347,344 | Waidelich | Apr. 25, 1944 |
| 2,373,247 | Jones et al. | Apr. 10, 1945 |
| 2,468,138 | Terry | Apr. 26, 1949 |
| 2,594,716 | Bailey | Apr. 29, 1952 |
| 2,611,115 | Johnston | Sept. 16, 1952 |